United States Patent
Hyoudou et al.

(10) Patent No.: US 8,263,673 B2
(45) Date of Patent: Sep. 11, 2012

(54) CLOSED-CELL FOAMED RUBBER SHEET, AND METHOD FOR PRODUCTION THEREOF

(75) Inventors: Shunji Hyoudou, Shimamoto-cho (JP); Kouichi Adachi, Hasuda (JP); Takao Suzuki, Hasuda (JP); Kentarou Nezu, Hasuda (JP)

(73) Assignee: Sekisui Chemical Co., Ltd., Osaka (JP)

( * ) Notice: Subject to any disclaimer, the term of this patent is extended or adjusted under 35 U.S.C. 154(b) by 287 days.

(21) Appl. No.: 12/451,899

(22) PCT Filed: Jun. 11, 2008

(86) PCT No.: PCT/JP2008/060714
§ 371 (c)(1),
(2), (4) Date: Dec. 4, 2009

(87) PCT Pub. No.: WO2008/153083
PCT Pub. Date: Dec. 18, 2008

(65) Prior Publication Data
US 2010/0105791 A1    Apr. 29, 2010

(30) Foreign Application Priority Data
Jun. 11, 2007  (JP) .................................. 2007-153716

(51) Int. Cl.
*C08J 9/06*    (2006.01)
*C09K 3/10*    (2006.01)

(52) U.S. Cl. .......... 521/94; 521/134; 521/140; 521/142; 521/150

(58) Field of Classification Search .................... 521/94, 521/134, 140, 142–150
See application file for complete search history.

(56) References Cited

U.S. PATENT DOCUMENTS

| | | | |
|---|---|---|---|
| 4,144,153 A * | 3/1979 | Shikinami et al. | 521/50.5 |
| 4,275,168 A * | 6/1981 | Watanabe et al. | 521/82 |
| 5,459,201 A * | 10/1995 | Shroff et al. | 525/197 |
| 5,786,406 A * | 7/1998 | Uejyukkoku et al. | 521/50.5 |
| 5,972,492 A | 10/1999 | Murakami et al. | |
| 6,166,144 A * | 12/2000 | Yamaguchi et al. | 525/211 |
| 2009/0169860 A1* | 7/2009 | Katsunori et al. | 428/314.8 |

FOREIGN PATENT DOCUMENTS

| | | |
|---|---|---|
| EP | 0 726 290 | 8/1996 |
| EP | 1 970 403 | 9/2008 |
| GB | 2123004 | * 1/1984 |
| JP | 50-158664 | 12/1975 |
| JP | 7-157588 | 6/1995 |
| JP | 8-277339 | 10/1996 |
| JP | 9-77896 | 3/1997 |
| JP | 9-87414 | 3/1997 |
| JP | 9-111899 | 4/1997 |
| JP | 2001-2866 | 1/2001 |
| JP | 2001-139929 | 5/2001 |
| WO | WO 2007/072885 | * 6/2007 |

OTHER PUBLICATIONS

International Search Report issued Aug. 12, 2008 in International (PCT) Application No. PCT/JP2008/060714.
Supplementary European Search Report issued May 3, 2012 in EP Application No. 08765485.1.

* cited by examiner

*Primary Examiner* — Irina S Zemel
(74) *Attorney, Agent, or Firm* — Wenderoth, Lind & Ponack, L.L.P.

(57) ABSTRACT

The present invention provides a closed-cell foamed rubber sheet whose sealability is less likely to decrease even after long-time use and which has excellent water resistance. The closed-cell foamed rubber sheet of the present invention comprises a rubber-based resin, and is provided by the steps of: providing a foamable resin composition containing the rubber-based resin and a foaming agent; irradiating the foamable resin composition with ionizing radiation to cross-link the foamable resin composition; and foaming the cross-linked foamable resin composition. In the case where the foamable resin composition further contains 0.5 parts by weight or more of a powdery additive other than the foaming agent per 100 parts by weight of the rubber-based resin, the rubber-based resin preferably contains a rubber-based resin ingredient which is in a liquid state at normal temperature.

9 Claims, No Drawings

CLOSED-CELL FOAMED RUBBER SHEET, AND METHOD FOR PRODUCTION THEREOF

This application is a U.S. national stage of International Application No. PCT/JP2008/060714 filed Jun. 11, 2008.

TECHNICAL FIELD

The present invention relates to a closed-cell foamed rubber sheet, which is suitably used as a seal material having excellent water resistance and closely adhering to a sealed portion for a long time, and a method for producing the same.

BACKGROUND ART

Foamed materials are currently used as seal materials in various fields such as civil engineering, architecture, electrics, electronics, and vehicles. Examples of the foamed materials used as such seal materials include thermoplastic resin foams comprising resins such as polyethylene-based resins and polypropylene-based resins, and rubber foams comprising rubbers such as synthetic and natural rubbers.

Of the seal materials, water-resistant seal materials are used for filling clearances of various structures such as buildings, electric devices, and vehicles to prevent water infiltration into the structures. The water-resistant seal material is placed at a portion to be sealed in its compressed state, and repulsion force generated by shape recovery from its compressed state allows the seal material to closely adhere to the interface of the sealed portion without a clearance.

In the case where the water-resistant seal material has low flexibility against compression, the water-resistant seal material generates too high repulsion force, resulting in deformation of the sealed portion. The deformation of the sealed portion causes expansion of the clearance of the structure. This results in decrease in adherence (hereinafter, referred to as sealability) of the water-resistant seal material to the sealed portion, thereby causing insufficient water resistance.

Accordingly, open-cell foamed materials are used as the water-resistant seal materials as the open-cell foamed materials have excellent flexibility against compression. On the other hand, the open-cell foamed material contains cells communicating with one another. This causes easy infiltration of water into the foamed material, resulting in poor water resistance. In the case where the open-cell foamed material absorbs water to swell and thereby achieves higher sealability, the open-cell foamed material has poor sealability until it sufficiently absorbs water, and thus, the open-cell foamed material allows water to infiltrate therein before achieving sufficient sealability.

Foamed materials having both closed cells and open cells are also used as the water-resistant seal materials. In such foamed materials, the closed cells contribute to good water resistance, and the open cells contribute to good flexibility against compression. For example, Patent Document 1 discloses a shaped seal material which comprises a foamed structure. The foamed structure contains both closed cells and open cells, and cell membranes absorb water to swell. The shaped seal material contains eight or more cells per 1 cm in length.

Disadvantageously, the repulsion force of the shaped seal material deteriorates when the shaped seal material is used for a long time. This causes reduction in sealability and results in insufficient water resistance.

Foamed materials used as water-resistant seal materials generally contain additives such as flame retardants, antioxidants, and pigments for improving their properties such as flame-retardant properties and weather resistance, for preventing oxidation and thermal degradation, and for coloring. Almost all of these additives are in a powder state, and the foamed material containing powdery additives generates heavy load upon kneading in the production. This causes poor productivity.

In the case where the foamed material contains the powdery additives, the powdery additives emerge on the surface of the material. This causes reduction in sealability and results in insufficient water resistance.

Patent Document 1: Japanese Kokai Publication H09-111899 (JP-A H09-111899)

DISCLOSURE OF THE INVENTION

Problems to be Solved by the Invention

The present invention provides a closed-cell foamed rubber sheet used as a seal material whose sealability is less likely to decrease even after long-time use and which closely adheres to a sealed portion for a long time. The present invention also provides a method for producing the same.

Means for Solving the Problems

The closed-cell foamed rubber sheet of the present invention contains a rubber-based resin. This closed-cell foamed rubber sheet is obtained by the steps of: providing a foamable resin composition containing the rubber-based resin and a foaming agent; irradiating the foamable resin composition with ionizing radiation to cross-link the foamable resin composition; and foaming the cross-linked foamable resin composition.

The rubber-based resin contained in the foamable resin composition is one having rubber elasticity at room temperature, and any rubber-based resin having rubber elasticity at room temperature may be used. Examples thereof include acrylonitrile-based rubbers such as acrylonitrile-butadiene rubber (NBR), hydrogenated acrylonitrile-butadiene rubber (HNBR), carboxylated acrylonitrile-butadiene rubber (XNBR), acrylonitrile-butadiene-isoprene rubber (NBIR), acrylonitrile-isoprene rubber (NIR), and a terpolymer of acrylonitrile, butadiene, and a functional monomer having effects such as an antiaging effect; chloroprene rubber (CR); isoprene rubber (IR); butyl rubber (IIR); natural rubber; styrene-butadiene rubber (SBR); butadiene rubber (BR); urethane rubber; fluorine rubber; acryl rubber; and silicone rubber. In particular, acrylonitrile-based rubbers are preferable as they can provide a closed-cell foamed rubber sheet having excellent sealability, flexibility against compression, durability, and oil resistance. More preferably used is acrylonitrile-butadiene rubber (NBR). The rubber-based resins having rubber elasticity at room temperature may be used alone, or two or more of these may be used in combination.

In the case where the foamable resin composition contains 0.5 parts by weight or more, preferably 1 part by weight or more, of the below-mentioned powdery additive other than the foaming agent per 100 parts by weight of the rubber-based resin, the rubber-based resin preferably contains a rubber-based resin ingredient which is in a liquid state at normal temperature (hereinafter, referred to as a liquid rubber-based resin ingredient). The foamable resin composition containing the liquid rubber-based resin ingredient can reduce kneading load of the foamable resin composition, and it can also be likely to prevent the powdery additive from emerging on the surface of the closed-cell foamed rubber sheet to be provided.

Particularly in the case where the rubber-based resin is an acrylonitrile-based rubber and the liquid rubber-based resin ingredient is a liquid acrylonitrile-based rubber, they are excellently compatible with each other. Thus, the liquid acrylonitrile-based rubber is uniformly dispersed in the acrylonitrile-based rubber without phase separation. Here, the liquid acrylonitrile-based rubber serves as a dispersant; that is to say, the liquid acrylonitrile-based rubber covers the particles of the powdery additive and uniformly disperses the covered particles of the powdery additive in the acrylonitrile-based rubber. Thus, the liquid acrylonitrile-based rubber prevents the powdery additive from emerging on the surface of the closed-cell foamed rubber sheet. In other words, the particles of the powdery additive are covered with the liquid acrylonitrile-based rubber, and thereby the powdery additive is surely prevented from emerging on the closed-cell foamed rubber sheet.

Accordingly, in the case where the closed-cell foamed rubber sheet containing the acrylonitrile-based rubber further contains the powdery additive and the liquid acrylonitrile-based rubber, the liquid acrylonitrile-based rubber contributes to excellent surface smoothness of the closed-cell foamed rubber sheet. Such a closed-cell foamed rubber sheet has excellent water resistance.

The liquid rubber-based resin ingredient is a rubber-based resin having liquidity at 23° C. and $1.01 \times 10^5$ Pa (1 atm). Examples thereof include: liquid acrylonitrile-based rubbers such as liquid acrylonitrile-butadiene rubber (liquid NBR), hydrogenated liquid acrylonitrile-butadiene rubber (liquid HNBR), carboxylated liquid acrylonitrile-butadiene rubber (liquid XNBR), liquid acrylonitrile-butadiene-isoprene rubber (liquid NBIR), liquid acrylonitrile-isoprene rubber (liquid NIR), and a liquid terpolymer of acrylonitrile, butadiene, and a functional monomer having effects such as an antiaging effect; and liquid isoprene rubber (liquid IR). In particular, liquid acrylonitrile-based rubbers are preferable as they can provide a closed-cell foamed rubber sheet having excellent sealability, flexibility against compression, durability, and oil resistance. More preferably used is liquid acrylonitrile-butadiene rubber (liquid NBR). The liquid rubber-based resin ingredients may be used alone, or two or more of these may be used in combination.

Liquid acrylonitrile-butadiene rubber (liquid NBR) is commercially available from, for example, ZEON Corporation under the trade name of NiPol 1312.

The amount of the liquid rubber-based resin ingredient in the rubber-based resin is preferably 0.5 to 50% by weight, more preferably 1 to 30% by weight, particularly preferably 5 to 30% by weight, and most preferably 8 to 30% by weight. If the rubber-based resin contains a smaller amount of the liquid rubber-based resin ingredient, the particles of the powdery additive may be insufficiently covered with the liquid rubber-based resin ingredient, or the particles of the powdery additive may be insufficiently dispersed in the rubber-based resin by the liquid rubber-based resin ingredient. Thus, the powdery additive may be likely to emerge on the surface of the closed-cell foamed rubber sheet to be provided, and the closed-cell foamed rubber sheet to be provided may have poor water resistance. If the rubber-based resin contains a larger amount of the liquid rubber-based resin ingredient, the foamable resin composition may have a low average molecular weight, and thus, the foamable resin composition may insufficiently cross-links or foams, or the closed-cell foamed rubber sheet to be provided may have poor mechanical strength.

The foaming agent contained in the foamable resin composition may be any powder as long as it is decomposed by heat to generate foaming gas. Examples thereof include azodicarbonamide, benzenesulfonyl hydrazide, dinitrosopentamethylenetetramine, toluenesulfonyl hydrazide, and 4,4-oxybis(benzenesulfonyl hydrazide). In particular, azodicarbonamide is preferably used. These foaming agents may be used alone, or two or more of these may be used in combination.

If the foamable resin composition contains a smaller amount of the foaming agent, the foamable resin composition may insufficiently foam and a closed-cell foamed rubber sheet may not be produced in a predetermined shape. If the foamable resin composition contains a larger amount of the foaming agent, abnormal foaming or foam breaking may occur and a predetermined closed-cell foamed rubber sheet may not be provided. Thus, the amount of the foaming agent in the foamable resin composition is preferably 1 to 30 parts by weight per 100 parts by weight of the rubber-based resin.

The foamable resin composition may further contain the powdery additive other than the foaming agent for enhancing functions of the closed-cell foamed rubber sheet to be provided. Any powdery additive may be used as long as it is in a powder state at 23° C. and $1.01 \times 10^5$ Pa (1 atm). Examples thereof include a flame retardant, an antioxidant, a filler, a pigment, a coloring agent, an antifungal agent, a foaming assistant, and a flame retardant assistant.

Any powdery flame retardant may be used. Examples thereof include metal hydroxides such as aluminum hydroxide and magnesium hydroxide, bromine-based flame retardants such as decabromodiphenyl ether, and phosphorous-based flame retardants such as ammonium polyphosphate. These flame retardants may be used alone, or two or more of these may be used in combination. The powdery flame retardant is commercially available from Albemarle Corporation under the trade name of SAYTEX 8010.

Any powdery antioxidant may be used. Examples thereof include phenol-based antioxidants and sulfur-based antioxidants. Concretely, the phenol-based antioxidant is commercially available from Ciba Specialty Chemical Corporation under the trade name of IRGANOX 1010. These powdery antioxidants may be used alone, or two or more of these may be used in combination.

Any powdery filler may be used as long as it can be dispersed in the closed-cell foamed rubber sheet. Examples thereof include talc, calcium carbonate, bentonite, carbon black, fumed silica, aluminum silicate, acetylene black, and aluminum powder. These fillers may be used alone, or two or more of these may be used in combination.

The filler may be in various sizes depending on its use. A powdery filler used in a seal material may generally have a volume average particle size of 0.1 to 100 μm. The volume average particle size may be measured by the method in accordance with JIS Z 8901.

If the foamable resin composition contains a larger total amount of the powdery additives other than the foaming agent, the foamable resin composition may generate heavy kneading load, and thereby the productivity of the closed-cell foamed rubber sheet may be low. In other cases, the particles of the powdery additives may be insufficiently covered with the liquid rubber-based resin ingredient, and thereby the powdery additives may be likely to emerge on the surface of the closed-cell foamed rubber sheet to be provided and the closed-cell foamed rubber sheet may have poor water resistance. If the foamable resin composition contains a smaller total amount of the powdery additives other than the foaming agent, performance of the foamable resin composition may not be improved. Thus, the total amount of the powdery additives other than the foaming agent in the foamable resin composition is preferably 150 parts by weight or less per 100 parts by weight of the rubber-based resin. It is preferably 1 to 100 parts by weight, more preferably 1 to 50 parts by weight, further preferably 1 to 20 parts by weight, particularly preferably 1 to 10 parts by weight, and most preferably 1 to 5 parts by weight per 100 parts by weight of the rubber-based resin. In the case where the foamable resin composition contains no flame retardant, the total amount of the powdery additives other than the foaming agent in the foamable resin composition is preferably 0.5 to 10 parts by weight, and more preferably 0.5 to 5 parts by weight per 100 parts by weight of the rubber-based resin.

The foamable resin composition may further contain a liquid additive.

In the case where the closed-cell foamed rubber sheet of the present invention contains an acrylonitrile-based rubber as the rubber-based resin, a liquid acrylonitrile-based rubber as the liquid rubber-based resin ingredient, and the powdery additive, it has excellent flexibility against compression and excellent resistance against shear stress applied in the surface direction of the closed-cell foamed rubber sheet. The closed-cell foamed rubber sheet surely fills a clearance of a structure without deformation at a sealed portion in the thickness direction of the closed-cell foamed rubber sheet. The closed-cell foamed rubber sheet is hardly deformed even in the case of application of shear stress in the surface direction during the use thereof, and it also surely fills the clearance of the structure in the surface direction (direction perpendicular to the thickness direction) of the closed-cell foamed rubber sheet. Thus, the closed-cell foamed rubber sheet surely fills the clearance of the structure in all of the directions and exerts excellent water resistance for a long time.

In the case where the closed-cell foamed rubber sheet of the present invention contains an acrylonitrile-based rubber as the rubber-based resin and a liquid acrylonitrile-based rubber as the liquid rubber-based resin ingredient, the closed-cell foamed rubber sheet is likely to follow irregularities on the sealed portion. Thus, the closed-cell foamed rubber sheet firmly adheres to the surface with irregularities on the sealed portion without a clearance. Even when stress is applied to the closed-cell foamed rubber sheet such that the closed-cell foamed rubber sheet is misaligned relative to the position of the sealed portion, adherence of the closed-cell foamed rubber sheet can minimize a degree of misalignment of the relative position between the closed-cell foamed rubber sheet and the sealed portion. Thus, the closed-cell foamed rubber sheet can exert excellent water resistance for a long time.

In the closed-cell foamed rubber sheet of the present invention, not all of the foams must be closed cells, but part of the cells may be open cells. If the closed cell ratio is lower, cells in the closed-cell foamed rubber sheet may communicate with one another and water may be likely to pass therethrough, resulting in poor water resistance of the closed-cell foamed rubber sheet. Thus, in the concrete, the closed cell ratio in the closed-cell foamed rubber sheet is preferably 80 to 100%, and more preferably 85 to 100%.

The closed cell ratio in the closed-cell foamed rubber sheet is determined as follows. First, a 5-cm flat square-shaped test piece having a constant thickness is cut out from the closed-cell foamed rubber sheet. Then, the weight $W_1$ and the thickness of the test piece are measured to determine the apparent volume $V_1$ of the test piece.

Next, the value obtained above is substituted in the following formula (1) to determine the apparent volume $V_2$ of the cells. Here, the density of the resin forming the test piece is represented as $\rho$ g/cm$^3$.

Apparent volume $V_2$ of the cells=$V_1$−$W_1$/$\rho$     Formula (1)

The test piece is immersed in distilled water such that the distance between the upper surface of the test piece and the surface of the water is to be 100 mm. Then, the test piece is pressurized at 15 kPa for 3 minutes. The test piece is taken out from the distilled water, and water on the surface of the test piece is removed. The weight $W_2$ of the test piece was measured, and the open cell ratio $F_1$ is determined according to the following formula (2). Then, the closed cell ratio $F_2$ is determined from the open cell ratio $F_1$.

Open cell ratio $F_1$(%)=100×($W_2$−$W_1$)/$V_2$     Formula (2)

Closed cell ratio $F_2$(%)=100−$F_1$     Formula (3)

If peel strength immediately after the production (hereinafter, referred to as initial peel strength) of the closed-cell foamed rubber sheet is lower, sealability of the closed-cell foamed rubber sheet may be poor. Thus, the initial peel strength is preferably 20 kPa or higher. On the other hand, higher initial peel strength may cause difficulty in peeling of the closed-cell foamed rubber sheet in the case of re-sticking due to, for example, a failure in sticking. Thus, the initial peel strength is more preferably 20 to 100 kPa.

The initial peel strength of the closed-cell foamed rubber sheet is determined as follows. First, a just-produced closed-cell foamed rubber sheet having a size of 25 mm in width× 12.5 mm in length×3.0 mm in thickness is prepared. Next, the closed-cell foamed rubber sheet is sandwiched between two acryl resin plates (25 mm in width×100 mm in length) to provide a laminated body. Then, the laminated body is placed on a horizontal plane and is pressurized in the thickness direction for 15 minutes by a 500-g weight placed on the center portion of the upper surface of the laminated body to provide a sample. Here, the sample comprises the closed-cell foamed rubber sheet and the acryl resin plates integrally laminated on both of the surfaces of the closed-cell foamed rubber sheet. Finally, peel strength of the just-produced sample is measured at a pulling speed of 50 mm/m in accordance with JIS K6850.

The thickness of the closed-cell foamed rubber sheet is preferably 0.2 to 10 mm, more preferably 0.5 to 8 mm, and particularly preferably 1 to 6 mm. If the thickness of the closed-cell foamed rubber sheet is thinner than 0.2 mm, the closed-cell foamed rubber sheet may exert poor flexibility against compression. The upper limit of the thickness of the closed-cell foamed rubber sheet is not particularly restricted. It is preferably 10 mm or thinner for easy handleability of the closed-cell foamed rubber sheet.

The following will describe the method for producing the closed-cell foamed rubber sheet of the present invention. The closed-cell foamed rubber sheet of the present invention may be produced by any method as long as the method comprises the steps of: providing the foamable resin composition; irradiating the foamable resin composition with ionizing radiation to cross-link the foamable resin composition; and foaming the cross-linked foamable resin composition. For example, the closed-cell foamed rubber sheet may be produced by: kneading the foamable resin composition with a kneader such as a Banbury mixer or a pressure kneader; continuously kneading the foamable resin composition with an apparatus such as an extruder, a calender apparatus, or a conveyer belt casting apparatus to provide a foamable sheet; irradiating the foamable sheet with ionizing radiation to cross-link the foamable sheet; and heating the cross-linked foamable sheet to foam the foamable sheet.

The foamable sheet is required to be cross-linked by irradiation of ionizing radiation. The cross-linking by ionizing radiation makes it possible to uniformly irradiate the foamable sheet with ionizing radiation in the thickness direction, thereby uniformly cross-linking the foamable sheet on the whole.

The thickness of the foamable sheet is required to be 0.1 to 3 mm in order to provide the closed-cell foamed rubber sheet with a thickness of 0.2 to 10 mm. For providing the closed-cell foamed rubber sheet with an accurately-controlled thickness by foaming such a thin foamable sheet, the foamable sheet is required to be uniformly cross-linked on the whole at very high accuracy and then to be foamed. Thus, the foamable sheet is cross-linked by irradiation of ionizing radiation in the present invention.

In the conventional vulcanization with disulfide, it is difficult to control cross-linking reaction of the foamable sheet and the foamable sheet is not always cross-linked uniformly on the whole. Thus, the foamable sheet is not uniformly foamed and a closed-cell foamed rubber sheet has a poorly-controlled thickness and has poor water resistance.

The surface of the foamable sheet is directly irradiated with ionizing radiation, and thus, the degree of cross-linking of the rubber-based resin at the surface of the foamable sheet is higher than that at the inside of the foamable sheet. Control of the dose of ionizing radiation makes it possible to control the degree of cross-linking of the rubber-based resin at the surface of the foamable sheet. Control of the dose of ionizing radiation can optimize the degree of cross-linking at the surface of the foamable sheet and makes the surface of the foamable sheet smooth. This allows the closed-cell foamed rubber sheet to have a smooth surface, and thus, the closed-cell foamed rubber sheet is likely to adhere to a sealed portion without a clearance.

When the closed-cell foamed rubber sheet adheres to the sealed portion without a clearance, a sheet-shaped seal material (the closed-cell foamed rubber sheet) closely adheres to the sealed portion owing to atmospheric pressure. Thus, the seal material (the closed-cell foamed rubber sheet) can favorably adhere to the sealed portion for a long time without adhesive.

Then, the uniformly cross-linked foamable sheet is foamed to provide a closed-cell foamed rubber sheet which contains uniform, small-sized foams. Such a closed-cell foamed rubber sheet containing uniform and small-sized foams has a smooth surface and has enhanced adhesiveness owing to a larger contact area with the sealed portion. Thus, the closed-cell foamed rubber sheet has high sealability and excellent water resistance.

The uniformly cross-linked foamable sheet is uniformly foamed on the whole. As a result, the closed-cell foamed rubber sheet to be provided has an accurately-controlled thickness.

The dose of ionizing radiation upon the cross-linking may be adjusted depending on characteristics of the rubber-based resin and use of the closed-cell foamed rubber sheet. The dose is preferably 0.5 to 10 Mrad, and more preferably 0.7 to 5.0 Mrad.

Effects of the Invention

The closed-cell foamed rubber sheet of the present invention is produced by cross-linking the foamable resin composition containing the rubber-based resin and foaming the cross-linked foamable resin composition. When used as a water-resistant seal material, the closed-cell foamed rubber sheet with a smooth surface adheres along the surface of the sealed portion without a clearance in either case where the sealed portion has a smooth surface or a rough surface. Thus, the closed-cell foamed rubber sheet has high sealability and excellent water resistance, and is suitably used as a water-resistant seal material which closely adheres to a sealed portion for a long time.

As the closed-cell foamed rubber sheet of the present invention has the aforementioned features, the closed-cell foamed rubber sheet has excellent flexibility against compression. When used as a water-resistant seal material, the closed-cell foamed rubber sheet does not cause deformation of the sealed portion due to repulsion force. Thus, the closed-cell foamed rubber sheet has excellent water resistance.

In the closed-cell foamed rubber sheet of the present invention, the foamable resin composition is irradiated with ionizing radiation, and thereby is cross-linked. Thus, the foamable resin composition is uniformly cross-linked on the whole. In addition, the degree of cross-linking of the foamable resin composition is controlled by fine adjustment of the dose of ionizing radiation applied to the foamable resin composition, while maintaining the surface smoothness of the foamable resin composition. Thus, the surface of the cross-linked foamable resin composition is made smooth.

The uniformly cross-linked foamable resin composition is uniformly foamed on the whole. Thus, the closed-cell foamed rubber sheet of the present invention has an accurately-controlled thickness. That is to say, the thickness of the closed-cell foamed rubber sheet is almost constant, and has excellent water resistance.

In the case where the foamable resin composition of the closed-cell foamed rubber sheet contains the liquid rubber-based resin ingredient, the liquid rubber-based resin ingredient contributes to reduction in load upon kneading the foamable resin composition. Thus, even in the case where the foamable resin composition contains the powdery additive, load upon kneading the foamable resin composition does not rise and the closed-cell foamed rubber sheet is produced with high productivity.

In the case where the foamable resin composition of the closed-cell foamed rubber sheet contains the liquid rubber-based resin ingredient and a predetermined amount of the powdery additive, the liquid rubber-based resin ingredient serves as a dispersant to uniformly disperse the particles of the powdery additive in the rubber-based resin and to cover particles of the powdery additive. The powdery additive does not emerge on the surface of the closed-cell foamed rubber sheet in such a case. Thus, in contrast to the conventional conditions, it is possible to prevent deterioration of sealability and water resistance due to the emergence of the powdery additive on the surface of the closed-cell foamed rubber sheet to be provided.

In the case where the foamable resin composition of the closed-cell foamed rubber sheet contains a liquid acrylonitrile-based rubber as the liquid rubber-based resin ingredient, the closed-cell foamed rubber sheet to be provided has more excellent sealability, flexibility against compression, durability, and oil resistance. Thus, the closed-cell foamed rubber sheet has more excellent sealability owing to its excellent adhesiveness and flexibility against compression. In addition, even in the case where the closed-cell foamed rubber sheet is used for a long time, repulsion force is less likely to reduce and thereby sealability is less likely to reduce owing to its durability. Furthermore, the closed-cell foamed rubber sheet is not likely to deteriorate owing to its excellent oil resistance, so that the closed-cell foamed rubber sheet exerts excellent water resistance for a long time.

BEST MODE FOR CARRYING OUT THE INVENTION

The following will more concretely describe the embodiments of the present invention referring to examples. The present invention is not limited to these examples.

EXAMPLES 1 to 13

COMPARATIVE EXAMPLE 2

A foamable resin composition containing: acrylonitrile-butadiene rubber (NBR, produced by ZEON Corp., trade name: Nipol DN401, density: 0.94 g/cm$^3$); liquid acrylonitrile-butadiene rubber (liquid NBR, produced by ZEON Corp., trade name: Nipol DN601, density: 0.98 g/cm$^3$); azodicarbonamide (produced by Otsuka Chemical Co., Ltd., trade name: SO-L, decomposition temperature: 197° C.) powdery phenol-based antioxidant (produced by Ciba Specialty Chemical Corp., trade name: IRGANOX 1010); powdery flame retardant (produced by Albemarle Corp., trade name: SAYTEX 8010); and powdery carbon black (produced by Asahi Carbon Co., Ltd., trade name: ASAHI #70), each in a predetermined amount shown in Tables 1 to 4, was kneaded with a pressure kneader. In the case where the foamable resin composition did not contain one or more of the ingredients, this case is indicated with the symbol "–" in the tables.

The liquid acrylonitrile-butadiene rubber is in a liquid state at 23° C. and $1.01 \times 10^5$ Pa. The powdery phenol-based antioxidant, the powdery flame retardant, and the powdery carbon black are in a powder state at 23° C. and $1.01 \times 10^5$ Pa.

The kneaded foamable resin composition was melted and kneaded in an extruder. The melted foamable resin composition was extruded from the extruder at an extrusion speed of 50 kg/h to provide a foamable sheet with a thickness of 1 mm.

The foamable sheet was irradiated with ionizing radiation on both of its surfaces at an acceleration voltage of 500 keV with the dose of 1.5 Mrad, and thus, the foamable sheet was cross-linked.

The cross-linked foamable sheet was foamed by heat at 240° C. in a foaming oven to provide a closed-cell foamed rubber sheet having an apparent density, a closed cell ratio, and a thickness shown in Table 1.

The aforementioned ingredients are referred to as follows in Tables 1 to 4. The acrylonitrile-butadiene rubber is referred to as "NBR". The liquid acrylonitrile-butadiene rubber is referred to as "liquid NBR". The powdery phenol-based antioxidant is referred to simply as "antioxidant". The powdery flame retardant is referred to simply as "flame retardant". The powdery carbon black is referred to simply as "carbon black".

COMPARATIVE EXAMPLE 1

To the foamable resin composition of Example 3 was blended 1.0 part by weight of dicumyl peroxide (produced by NOF Corp., trade name: PERCUMYL D40, 1-minute half-life temperature: 175.2° C.) as a cross-linking agent to prepare a foamable resin composition. The thus-prepared foamable resin composition was kneaded with a pressure kneader.

The kneaded foamable resin composition was melted and kneaded in an extruder. The melted foamable resin composition was extruded from the extruder at an extrusion speed of 50 kg/h to provide a foamable sheet. The obtained foamable sheet was cross-linked by heat for 5 minutes in a 130° C. heating oven.

The cross-linked foamable sheet was foamed by heat at 240° C. in a foaming oven. Thus, a closed-cell foamed rubber sheet having an apparent density of 39 kg/m$^3$, a closed cell ratio of 88%, and a thickness of 3.0 mm was provided.

The foamable resin composition was evaluated for a kneading load, and the closed-cell foamed rubber sheet was evaluated for an initial peel strength and water resistance in accordance with the following ways. Tables 1 to 4 show the results.

(Kneading Load)

During the production of the closed-cell foamed rubber sheet, the maximum amperage (A) of the main motor of the extruder upon melting and kneading the foamable resin composition was measured.

(Initial Peel Strength)

The just-produced closed-cell foamed rubber sheet was cut in a size of 25 mm in width×12.5 mm in length. The cut closed-cell foamed rubber sheet was sandwiched by two acryl resin plates each in a size of 25 mm in width×100 mm in length to provide a laminated body, and the laminated body was placed on a horizontal plane. The laminated body was pressurized in the thickness direction for 15 minutes by a 500-g weight placed on the center portion of the upper surface of the laminated body to provide a sample. The sample comprised the closed-cell foamed rubber sheet and the acryl resin plates integrally laminated on both of the surfaces of the rubber sheet.

A peel strength (kPa) of the just-produced sample was measured at a pulling speed of 50 mm/m in accordance with JIS K6850. In every case, interfacial peeling occurred upon peeling off the sample.

(Water Resistance of Seal Material Adhering to Sealed Portion Against Distilled Water)

The obtained closed-cell foamed rubber sheet was cut in an annular shape (outer diameter: 100 mm, inner diameter: 80 mm, thickness: 3.0 mm) to prepare a test piece. The test piece was placed at the center of a flat acryl resin plate. Then, another flat acryl resin plate with a through hole at the center portion was placed on the test piece such that the through hole was located on the center of the circle of the test piece to prepare a laminated body. The laminated body was compressed in the thickness direction of the test piece, thereby providing a sample in which the distance between the surfaces facing to each other of the acryl plates was 2.55 mm (compression rate of test piece: 15%).

Distilled water was poured via the through hole of the sample into the space defined by the sample piece and the surfaces facing to each other of the two acryl resin plates, and the space was filled with distilled water. The sample was then pressurized at 15 kPa from the through hole. A time period from the start of the pressurization to the leakage of distilled water (water-resistant time (minutes)) was measured. In the case where the water-resistant time was longer than 120 minutes, this case is indicated with the phrase "no leakage" in Table 1.

(Water Resistance of Seal Material Adhering to Sealed Portion Against Aqueous Solution of Surfactant)

A sample having the same shape as that of the sample for the evaluation for water resistance against distilled water was prepared. An aqueous solution of a surfactant (produced by Prostaff, car shampoo S-01) was poured via the through hole of the sample into the space defined by the sample piece and the surfaces facing to each other of the two acryl resin plates, and the space was filled with the aqueous solution of the surfactant. A time period from the start of the pressurization to the leakage of the aqueous solution of the surfactant (water-resistant time (minutes)) was measured. In the case where the aqueous solution of the surfactant leaked within an hour, water resistance was evaluated as "bad"; in the case where the aqueous solution of the surfactant did not leak over an hour and leaked within 6 hours, water resistance was evaluated as "good"; and in the case where the aqueous solution of the surfactant did not leak over 6 hours, water resistance was evaluated as "very good".

TABLE 1

|  |  | Example 1 | Example 2 | Example 3 | Comparative Example 1 |
|---|---|---|---|---|---|
| Rubber-based resin (parts by weight) | NBR | 100 | 90 | 100 | 100 |
|  | Liquid NBR | — | 10 | — | — |
| Powdery additive (parts by weight) | Antioxidant | 0.1 | 0.1 | 0.1 | 0.1 |
|  | Flame retardant | — | 20 | 20 | 20 |
|  | Carbon black | — | 5.0 | 5.0 | 5.0 |
| Foaming agent (parts by weight) | Azodicarbonamide | 15 | 15 | 15 | 15 |
| Cross-linking agent (parts by weight) | Dicumyl peroxide | — | — | — | 1.0 |
| Closed-cell foamed rubber sheet | Apparent density (kg/m$^3$) | 35 | 40 | 40 | 39 |
|  | Closed cell ratio (%) | 93 | 91 | 90 | 88 |
|  | Thickness (mm) | 3.0 | 3.0 | 3.0 | 3.0 |
| Kneading load (A) |  | 355 | 368 | 485 | 490 |
| Initial peel strength (kPa) |  | 27 | 31 | 18 | 12 |
| Water resistance against distilled water (min.) |  | No leakage | No leakage | 54 | 30 |
| Water resistance against aqueous solution of surfactant |  | Very good | Good | Bad | Bad |

TABLE 2

|  |  | Example 4 | Example 5 | Example 6 | Example 7 |
|---|---|---|---|---|---|
| Rubber-based resin (parts by weight) | NBR | 99.7 | 98.8 | 72 | 45 |
|  | Liquid NBR | 0.3 | 1.2 | 28 | 55 |
| Powdery additive (parts by weight) | Antioxidant | 0.1 | 0.1 | 0.1 | 0.1 |
|  | Flame retardant | 20 | 20 | 20 | 20 |
|  | Carbon black | 5.0 | 5.0 | 5.0 | 5.0 |
| Foaming agent (parts by weight) | Azodicarbonamide | 15 | 15 | 15 | 15 |
| Cross-linking agent (parts by weight) | Dicumyl peroxide | — | — | — | — |
| Closed-cell foamed rubber sheet | Apparent density (kg/m$^3$) | 40 | 40 | 40 | 40 |
|  | Closed cell ratio (%) | 92 | 92 | 93 | 94 |
|  | Thickness (mm) | 3.0 | 3.0 | 3.0 | 3.0 |
| Kneading load (A) |  | 460 | 425 | 320 | 150 |
| Initial peel strength (kPa) |  | 19 | 25 | 28 | 15 |
| Water resistance against distilled water (min.) |  | 85 | 105 | No leakage | 70 |
| Water resistance against aqueous solution of surfactant |  | Bad | Bad | Good | Good |

TABLE 3

|  |  | Example 8 | Example 9 | Example 10 | Example 11 | Comparative Example 2 |
|---|---|---|---|---|---|---|
| Rubber-based resin (parts by weight) | NBR | 90 | 90 | 90 | 75 | 100 |
|  | Liquid NBR | 10 | 10 | 10 | 25 | — |
| Powdery additive (parts by weight) | Antioxidant | 0.1 | 0.1 | 0.1 | 0.1 | 0.1 |
|  | Flame retardant | — | — | 20 | 25 | — |
|  | Carbon black | 0.5 | 1 | 25 | 30 | 1 |
| Foaming agent (parts by weight) | Azodicarbonamide | 15 | 15 | 15 | 15 | 15 |
| Cross-linking agent (parts by weight) | Dicumyl peroxide | — | — | — | — | — |
| Closed-cell foamed rubber sheet | Apparent density (kg/m$^3$) | 40 | 40 | 38 | 35 | 40 |
|  | Closed cell ratio (%) | 92 | 92 | 90 | 88 | 93 |
|  | Thickness (mm) | 3.0 | 3.0 | 3.0 | 3.0 | 3.0 |
| Kneading load (A) |  | 360 | 366 | 390 | 440 | 430 |
| Initial peel strength (kPa) |  | 35 | 33 | 22 | 19 | 24 |
| Water resistance against distilled water (min.) |  | No leakage | No leakage | No leakage | 80 | 40 |
| Water resistance against aqueous solution of surfactant |  | Very good | Very good | Good | Good | Bad |

TABLE 4

|  |  | Example 12 | Example 13 |
|---|---|---|---|
| Rubber-based resin (parts by weight) | NBR | 95 | 95 |
|  | Liquid NBR | 5 | 5 |
| Powdery additive (parts by weight) | Antioxidant | 0.3 | 0.3 |
|  | Flame retardant | — | — |
|  | Carbon black | 0.5 | 3 |
| Foaming agent (parts by weight) | Azodicarbonamide | 15 | 15 |
| Cross-linking agent (parts by weight) | Dicumyl peroxide | — | — |
| Closed-cell foamed rubber sheet | Apparent density (kg/m$^3$) | 40 | 40 |
|  | Closed cell ratio (%) | 93 | 93 |
|  | Thickness (mm) | 3.0 | 3.0 |
| Kneading load (A) |  | 365 | 370 |
| Initial peel strength (kPa) |  | 35 | 34 |
| Water resistance against distilled water (min.) |  | No leakage | No leakage |
| Water resistance against aqueous solution of surfactant |  | Very good | Very good |

INDUSTRIAL APPLICABILITY

The closed-cell foamed rubber sheet of the present invention has sealability which is less likely to decrease even after long-time use, and is suitably used as a water-resistant seal material.

The invention claimed is:

1. A closed-cell foamed rubber sheet comprising a rubber-based resin, which is obtained by the steps of:
   providing a foamable resin composition containing 100 parts by weight of the rubber-based resin which contains an acrylonitrile-based rubber having rubber elasticity and a liquid acrylonitrile-based rubber ingredient, and a foaming agent;
   irradiating the foamable resin composition with ionizing radiation to cross-link the foamable resin composition; and
   foaming the cross-linked foamable resin composition.

2. The closed-cell foamed rubber sheet according to claim 1,
   wherein the rubber-based resin contains an acrylonitrile-based rubber having rubber elasticity and a liquid acrylonitrile-based rubber ingredient, and
   wherein the foamable resin composition further contains 1 part by weight or more of a powdery additive other than the foaming agent per 100 parts by weight of the rubber-based resin.

3. The closed-cell foamed rubber sheet according to claim 1,
   wherein the acrylonitrile-based rubber having rubber elasticity is an acrylonitrile-butadiene rubber, and the liquid acrylonitrile-based rubber ingredient is a liquid acrylonitrile-butadiene rubber.

4. The closed-cell foamed rubber sheet according to claim 1,
   wherein a closed cell ratio in the rubber sheet is 80 to 100%.

5. The closed-cell foamed rubber sheet according to claim 1,
   wherein an initial peel strength of the rubber sheet is 20 kPa or higher.

6. A method for producing a closed-cell foamed rubber sheet, comprising the steps of:
   providing a foamable sheet of a foamable resin composition comprising:
   100 parts by weight of a rubber-based resin containing an acrylonitrile-based rubber having rubber elasticity and a liquid acrylonitrile-based rubber ingredient;
   a foaming agent; and
   0.5 parts by weight or more of a powdery additive other than the foaming agent;
   irradiating the foamable sheet with ionizing radiation to cross-link the foamable sheet; and
   foaming the cross-linked foamable sheet.

7. The closed-cell foamed rubber sheet according to claim 1,
   wherein the amount of the liquid acrylonitrile-based rubber ingredient in the rubber-based resin is 0.5 to 50% by weight.

8. The closed-cell foamed rubber sheet according to claim 7,
   wherein the acrylonitrile-based rubber having rubber elasticity is an acrylonitrile-butadiene rubber, and the liquid acrylonitrile-based rubber ingredient is a liquid acrylonitrile-butadiene rubber.

9. The closed-cell foamed rubber sheet according to claim 1,
   wherein the foamable resin composition further contains 0.5 parts by weight or more of a powdery additive other than the foaming agent per 100 parts by weight of the rubber-based resin.

* * * * *